(12) United States Patent
Ugur et al.

(10) Patent No.: US 8,416,861 B2
(45) Date of Patent: Apr. 9, 2013

(54) FIXED-POINT IMPLEMENTATION OF AN ADAPTIVE IMAGE FILTER WITH HIGH CODING EFFICIENCY

(75) Inventors: Kemal Ugur, Tampere (FI); Antti Olli Hallapuro, Tampere (FI); Dmytro Rusanovskyy, Tampere (FI); Jani Lainema, Tampere (FI)

(73) Assignee: Nokia Corporation, Espoo (FI)

( * ) Notice: Subject to any disclaimer, the term of this patent is extended or adjusted under 35 U.S.C. 154(b) by 1096 days.

(21) Appl. No.: 12/250,236

(22) Filed: Oct. 13, 2008

(65) Prior Publication Data

US 2009/0097547 A1    Apr. 16, 2009

Related U.S. Application Data

(63) Continuation-in-part of application No. 11/872,024, filed on Oct. 14, 2007.

(60) Provisional application No. 61/019,659, filed on Jan. 8, 2008.

(51) Int. Cl.
  *H04N 7/12* (2006.01)
  *H04N 11/02* (2006.01)
  *H04N 11/04* (2006.01)

(52) U.S. Cl. .......... 375/240.29; 375/240.02; 375/240.03

(58) Field of Classification Search .......................... None
  See application file for complete search history.

(56) References Cited

U.S. PATENT DOCUMENTS

| | | | | |
|---|---|---|---|---|
| 5,530,661 A | * | 6/1996 | Garbe et al. | 708/420 |
| 5,729,483 A | | 3/1998 | Brown | |
| 5,809,182 A | * | 9/1998 | Ward et al. | 382/298 |
| 6,339,434 B1 | * | 1/2002 | West et al. | 345/667 |
| 2002/0076121 A1 | | 6/2002 | Shimizu et al. | |
| 2002/0118303 A1 | * | 8/2002 | Nieuwenhuizen | 348/607 |
| 2004/0151253 A1 | * | 8/2004 | Bossen | 375/243 |

(Continued)

FOREIGN PATENT DOCUMENTS

| | | |
|---|---|---|
| EP | 0474226 A | 3/1992 |
| EP | 0644684 A | 3/1995 |

(Continued)

OTHER PUBLICATIONS

Bossen, Frank, "Full 16-Bit Implementation of 1/4 Pel Motion Compensation", Document JVT-C037, Joint Video Team (JVT) of ISO/IEC MPEG & ITU-T VCEG, 3rd Meeting: Fairfax, Virginia, May 6-10, 2002, 4 pages.

(Continued)

*Primary Examiner* — Jae Y Lee
(74) *Attorney, Agent, or Firm* — Alston & Bird LLP

(57) ABSTRACT

In accordance with an embodiment of the present invention, a method comprising: representing coefficients of an adaptive image filter in binary words wherein the coefficients are restricted and the binary words have a maximum number of bits defined at least in part by a precision index; computing at least one of a convolution sum and multiple partial convolution sums of the adaptive image filter wherein the at least one of a convolution sum and multiple partial convolution sums having a constrained value range and having a binary representation with a fixed maximum number of bits; and generating the output of the adaptive image filter based at least in part on the at least one of a convolution sum and multiple partial convolution sums, is disclosed.

20 Claims, 12 Drawing Sheets

U.S. PATENT DOCUMENTS

| | | |
|---|---|---|
| 2004/0161035 A1 | 8/2004 | Wedi |
| 2004/0161157 A1* | 8/2004 | Sato et al. ............... 382/236 |
| 2005/0105621 A1 | 5/2005 | Cheng |
| 2005/0123040 A1 | 6/2005 | Bjontegard |
| 2006/0200883 P1 | 9/2006 | Koyanagi |
| 2006/0208831 A1 | 9/2006 | Koyanagi |
| 2007/0140088 A1* | 6/2007 | Hino et al. ............. 369/59.22 |

FOREIGN PATENT DOCUMENTS

| | | |
|---|---|---|
| GB | 2373661 A | 9/2002 |
| WO | WO 97/17801 A1 | 5/1997 |
| WO | WO 03/026296 | 3/2003 |

OTHER PUBLICATIONS

Vatis, Y., et al., "Motion and Aliasing-Compensated Prediction Using a Two-Dimensional Non-Separable Adaptive Wiener Interpolation Filter," IEEE International Conference on Image Processing (ICIP), vol. 2, Sep. 11-14, 2005, pp. 894-897.

Wedi, T., et al., "Motion and Aliasing-Compensated Prediction for Hybrid Video Coding," IEEE Transactions on Circuits and Systems for Video Technology, vol. 13, No. 7, Jul. 2003, pp. 577-586.

Wedi, T., "A Time-Recursive Interpolation Filter for Motion Compensated Prediction Considering Aliasing," IEEE International Conference on Image Processing (ICIP), vol. 3, Oct. 24-28, 1999, pp. 672-675.

"International Search Report and The Written Opinion of the International Searching Authority", received in corresponding PCT Application No. PCT/IB2008/002709, Dated May 4, 2009, 14 pages.

Ugur, K.. et al.; "Adaptive Interpolation Filter with Flexible Symmetry for Coding High Resolution High Quality Video"; International Conference on Acoustics, Speech, and Signal Processing; Apr. 15, 2007, pp. I-1013 to I-1016.

Office Action from Canadian Application No. 2,701,657 dated Jul. 10, 2012.

* cited by examiner

FIXED-POINT IMPLEMENTATION OF AN ADAPTIVE IMAGE FILTER WITH HIGH CODING EFFICIENCY

RELATED APPLICATIONS

This application is a continuation-in-part of U.S. patent application Ser. No. 11/872,024 filed Oct. 14, 2007. This application also claims the benefit of U.S. Patent Application No. 61/019,659 filed Jan. 8, 2008. Each of these applications is hereby incorporated by reference in their entirety.

TECHNICAL FIELD

The present application relates generally to video coding and more particularly to fixed-point implementation of an adaptive image filter with high coding efficiency.

BACKGROUND

A video codec comprises an encoder that transforms an input video sequence into a compressed representation suited for storage/transmission and a decoder that can uncompress the compressed video representation back into a viewable form. Typically the encoder discards some information in the original input video sequence in order to represent the video in a more compact form (for example at a lower bit rate).

A hybrid video codec, for example ITU-T H.263 and H.264, encodes the video information in two phases. First, pixel values in a certain picture area, e.g. a block, are predicted for example by motion compensation means, e.g. finding and indicating an area in one of the previously coded video frames that corresponds closely to the block being coded, or by spatial means, e.g. using the already coded pixel values around the block to be coded in a specified manner. Second, the prediction error, e.g. the difference between the predicted block of pixels and the original block of pixels, is coded. This is typically done by transforming the difference in pixel values using a specified transform, e.g. Discrete Cosine Transform (DCT) or a variant of it, quantizing the DCT coefficients and entropy coding the quantized coefficients. By varying the fidelity of the quantization process, the encoder can control the balance between the accuracy of the pixel representation, e.g. picture quality, and size of the resulting coded video representation, e.g. file size or transmission bit rate.

The decoder reconstructs an output video sequence by applying prediction means similar to the encoder. A predicted representation of a given pixel block, in a current frame to be reconstructed, is formed by the decoder using the motion or spatial information coded in the compressed representation and pixel values from image blocks that were decoded prior to the given pixel block. The decoder also recovers prediction error by applying entropy decoding, dequantization and inverse transform to the DCT coefficients coded in the compressed representation. After applying prediction and prediction error decoding the decoder sums up the prediction and prediction error signals (pixel values) to form the output video frame. The decoder, and encoder, can also apply additional filtering to improve the quality of the output video before passing it for display and/or storage as prediction reference for the subsequent frames in the video sequence.

SUMMARY

In accordance with an exemplary embodiment of the present invention, a method, comprising: representing coefficients of an adaptive image filter in binary words wherein the coefficients are restricted and the binary words have a maximum number of bits defined at least in part by a precision index; computing at least one of a convolution sum and multiple partial convolution sums of the adaptive image filter wherein the at least one of a convolution sum and multiple partial convolution sums having a constrained value range and having a binary representation with a fixed maximum number of bits; and generating the output of the adaptive image filter based at least in part on the at least one of a convolution sum and multiple partial convolution sums, is disclosed.

In accordance with another exemplary embodiment of the present invention, an apparatus, comprising: an adaptive image filter characterized by: coefficients of the adaptive image filter being restricted and having binary representation with maximum number of bits defined at least in part by a precision index; an integer arithmetic implementation with a fixed maximum number of bits wherein the implementation including the computation of at least one of a convolution sum and multiple partial convolution sums using at least the coefficients and image data samples wherein the at least one of a convolution sum and multiple partial convolution sums having a constrained value range; a processor; and a memory unit communicatively connected to the processor and sufficient to store the coefficients and multiple image data samples, is disclosed.

In accordance with another exemplary embodiment of the present invention, a computer program product embodied on a computer-readable medium comprising: a computer code configured to compute at least one of a convolution sum and multiple partial convolution sums of an adaptive filter with integer arithmetic having a fixed maximum number of bits based on coefficients of an adaptive filter and image data samples wherein the coefficients are restricted and having binary representation with maximum number of bits defined at least in part by a precision index; and generating the output of the adaptive image filter based at least in part on the at least one of a convolution sum and multiple partial convolution sums wherein the output has a binary representation having the fixed maximum number of bits, is disclosed.

BRIEF DESCRIPTION OF THE DRAWINGS

For a more complete understanding of exemplary embodiments of the present invention, the objects and potential advantages thereof, reference is now made to the following descriptions taken in connection with the accompanying drawings in which.

DETAILED DESCRIPTION OF THE DRAWINGS

Exemplary embodiments of the present invention and its potential advantages are best understood by referring to FIG. 1 through FIG. 12 of the drawings, like numerals being used for like and corresponding parts of the various drawings.

Figure 1:
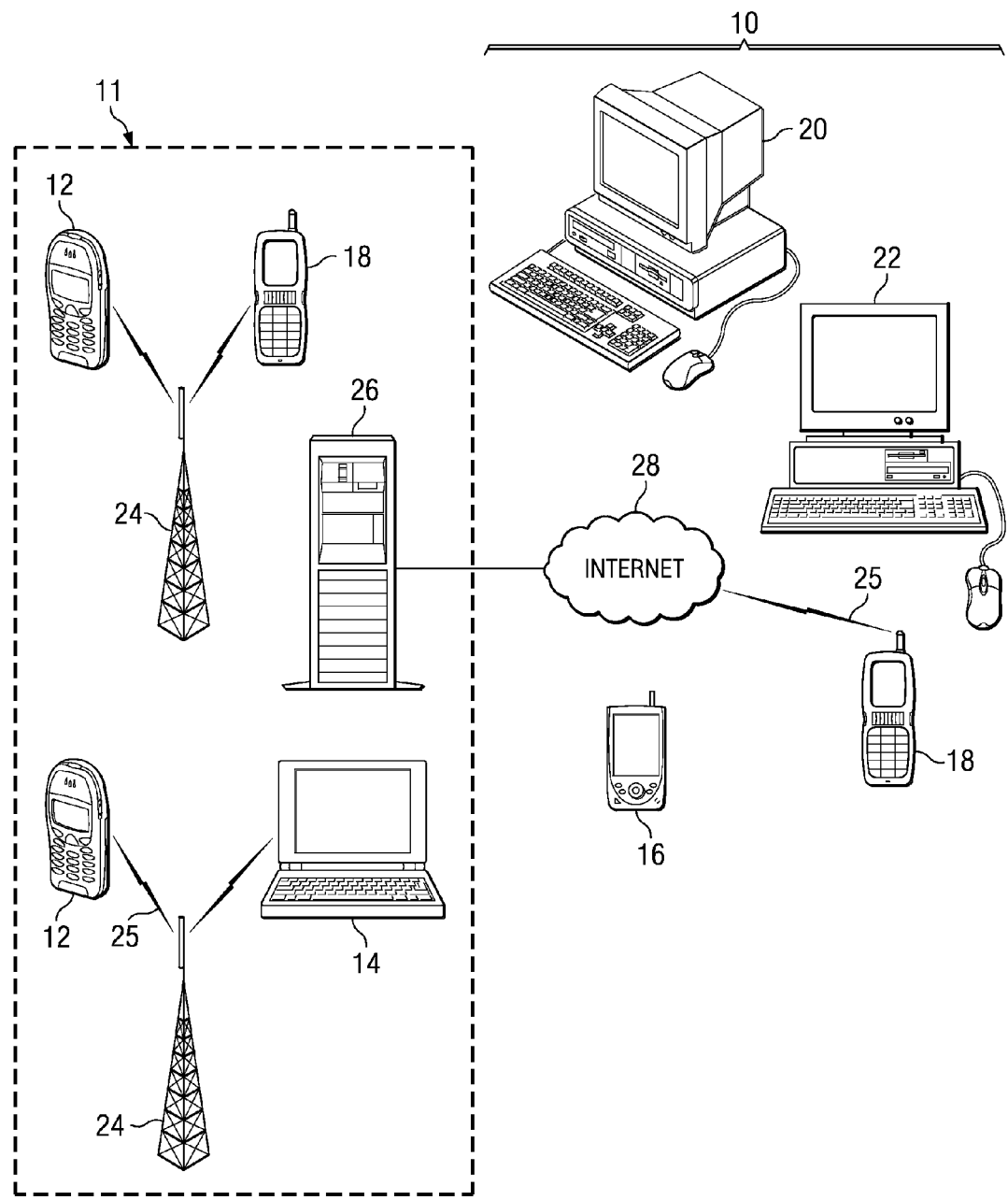
FIG. 1 is an overview diagram of an exemplary system within which embodiments of the present invention may be implemented.

FIG. 1 is an overview diagram of an exemplary system 10 within which embodiments of the present invention may be implemented. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For example, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, TV broadcasting, and the like.

The exemplary communication devices of the system 10 may include, but are not limited to, a combination of personal digital assistant (PDA) and mobile phone 14, a mobile phone 12, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be coupled to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 2:
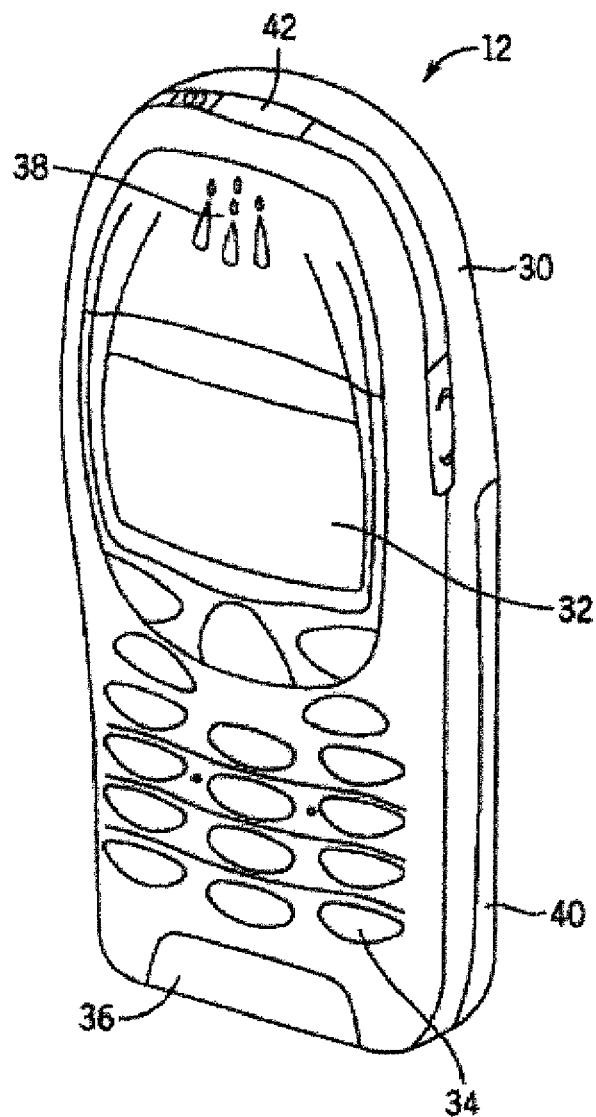
FIG. 2 is a perspective view of an exemplary apparatus within which embodiments of the present invention may be implemented.
Figure 3:
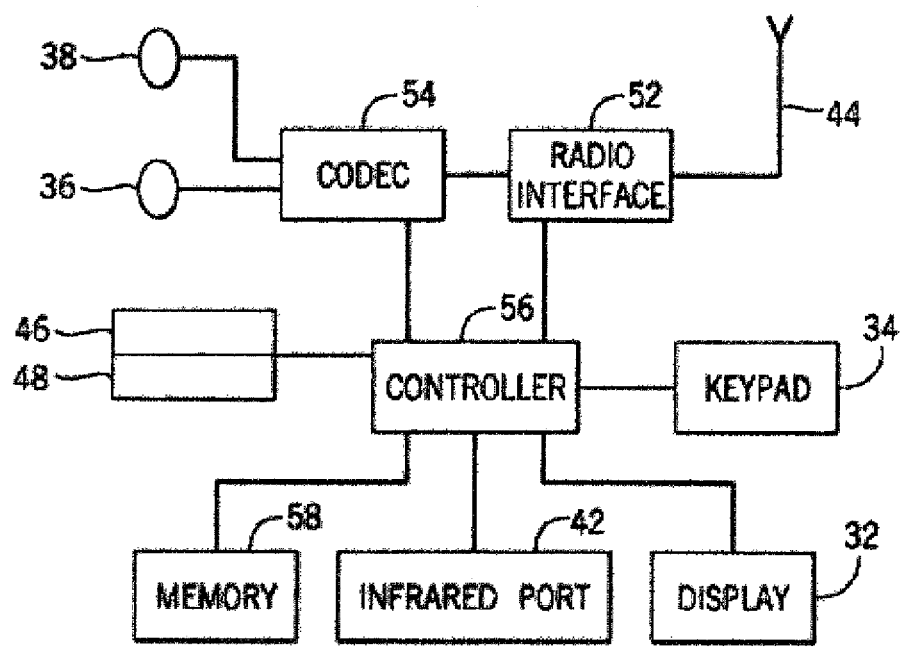
FIG. 3 is a schematic diagram of an exemplary circuitry of the apparatus of FIG. 2.

FIG. 2 is a perspective view of an exemplary apparatus within which embodiments of the present invention may be implemented and FIG. 3 is a schematic diagram of an exemplary circuitry of the apparatus of FIG. 2. It should be understood, however, that the present invention is not intended to be limited to one particular type of mobile device 12 or other electronic device. Some or all of the features depicted in FIGS. 2 and 3 may be incorporated into any or all of the devices represented in FIG. 1. The mobile device 12 of FIGS. 2 and 3 comprises a housing 30, a display 32, a keypad 34, a microphone 36, an ear-piece 38, a battery 40, an infrared port 42, an antenna 44, a smart card 46 according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Figure 4:
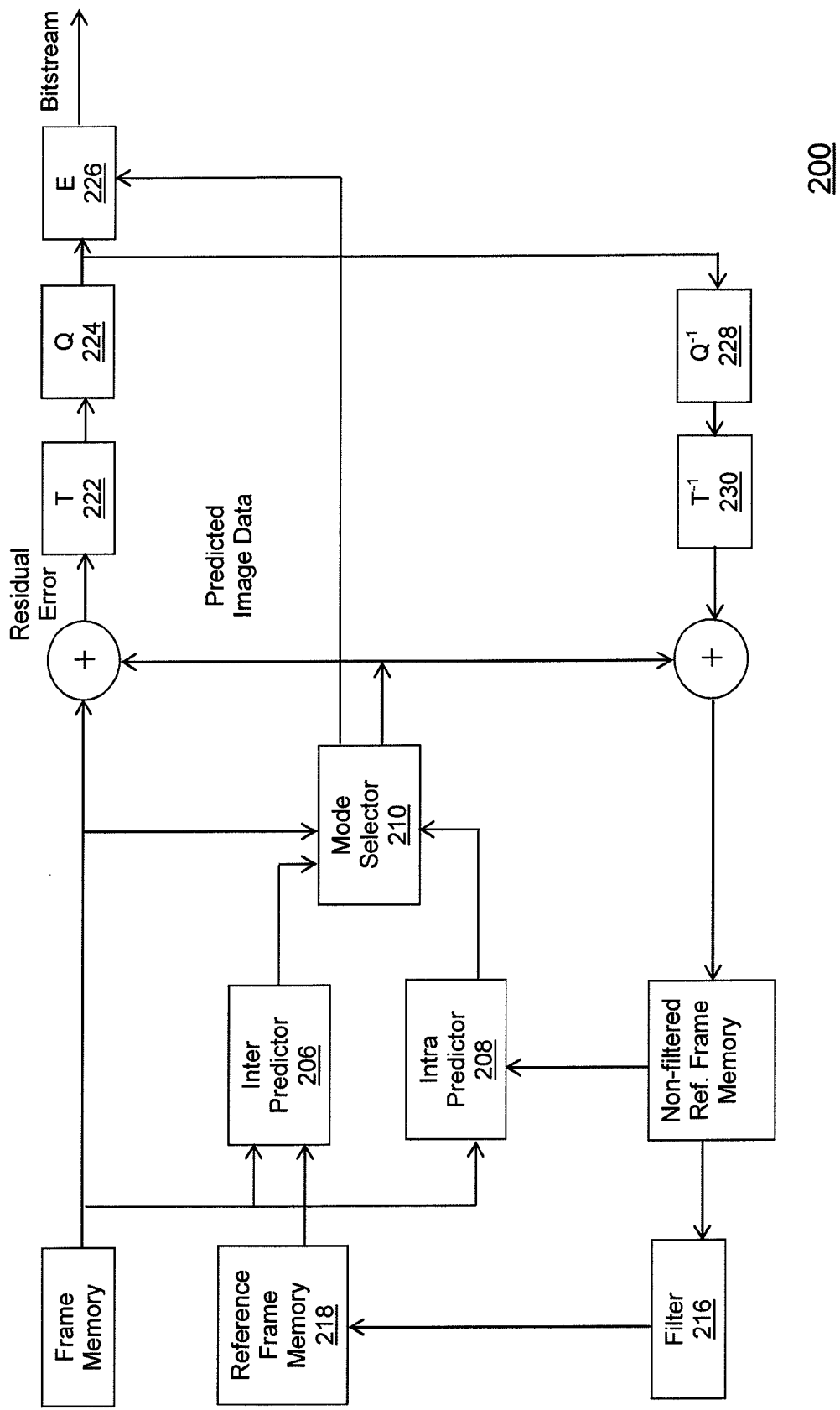
FIG. 4 is a block diagram of an exemplary hybrid video encoder.

FIG. 4 is a block diagram of an exemplary hybrid video encoder 200. Encoder 200 may be part of an electronic device, for example mobile device 12. At the encoder level an image or frame block in a current frame, e.g. a frame currently being coded by the encoder, is inter predicted, for example by an inter-predictor 206. Alternatively, image or frame block may be intra predicted, for example by an intra-predictor 208. In inter prediction the image or frame block is predicted from another image block in a reference frame stored by the encoder. A motion vector describing the difference in position between both image blocks is coded in the compressed representation. In intra prediction, pixel values in the current frame, that were coded prior to the image or frame block being coded are used to predict the pixel values of the image or frame block being coded. A mode selector 210 decides whether inter or intra prediction is to be used. The predicted image data is subtracted from the actual frame data resulting in residual error. A transformation, e.g. a discrete cosine transform DCT 222, is applied to the residual error to generate DCT coefficients. The DCT coefficients may be quantized by a quantizer 224 and entropy coded by an entropy coder 226. A dequantizer 228 and an inverse transformer 230 may also be applied to the quantized coefficients to generate the residual error. The generated residual error and the predicted image data are added to reconstruct a reference frame. The reconstructed reference frame may be further filtered by a filter 216 to improve image quality. The filtered reference frame may then be stored in reference frame memory 218 for inter prediction when coding subsequent frames. At the encoder level, interpolation may be applied to an area of the image or frame. Within interpolated areas, coordinates of the motion vectors may have values with fractions of a pixel. For example the H.264 video standard may have motion vectors with coordinates described in half pixel and quarter pixel. Exemplary embodiments of the present invention teach adaptive filter implementations with high coding efficiency. In an exemplary embodiment, the adaptive filter may be applied for interpolation in order to enhance coding efficiency and filter coefficients may be transmitted to the decoder in within the bit stream. The filter coefficients, if selected from list known to encoder 200 and decoder, may also be signaled, e.g. indicating the selected filter coefficients from the list, in the bit stream.

Figure 5:
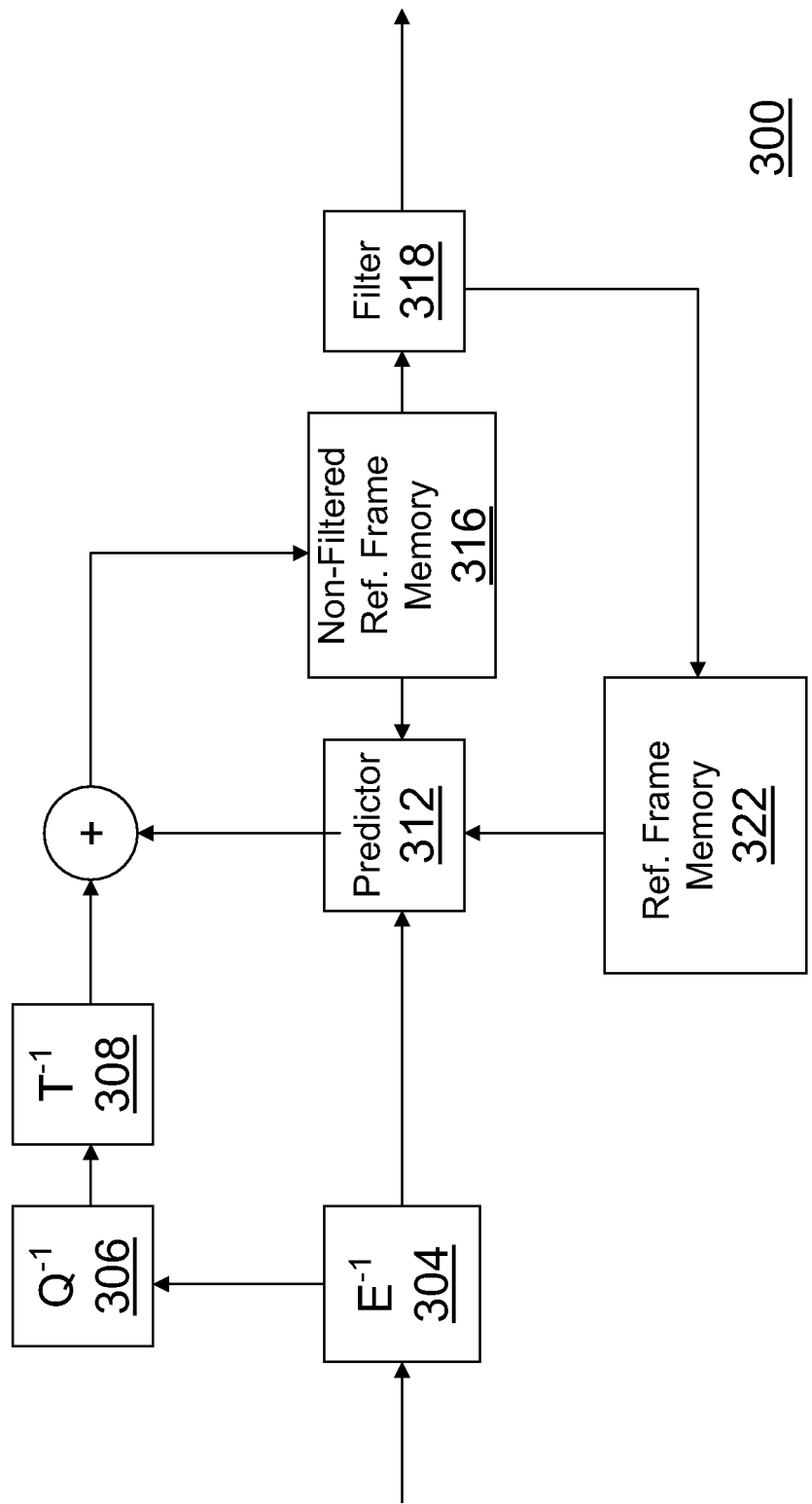
FIG. 5 is a block diagram of an exemplary hybrid video decoder.

FIG. 5 is a block diagram of an exemplary hybrid video decoder 300. Decoder 300 may be part of an electronic device, for example mobile device 12. At the decoder, a bit stream may be first entropy decoded, for example by an entropy decoder 304. The DCT coefficients from entropy decoder 304 may be inverse quantized, for example by an inverse quantizer 306. The inverse quantized DCT coefficients from inverse quantizer 306 may be inverse transformed by an inverse DCT transform 308 to generate residual error. Prediction information, e.g. motion vectors, may be used, for example by a predictor 312, to generate predicted data from stored reference frames or previously decoded pixels in the current frame. The predictor may apply inter prediction or intra prediction. The type of inter prediction to be applied is usually signaled to the decoder 300 in the bit stream. Prediction data and residual error are summed up to generate a preliminary reconstructed image. The preliminary reconstructed image may be used, by the predictor 312, to generate predicted data. Filtering may be applied, by a filter 318, to the preliminary reconstructed image in order to eliminate blocking and other undesirable effects and generate a final reconstruction of the coded frame. At the decoder 300 level, filter coefficients may be obtained from the bit stream. Decoder 300 may then use filter coefficients to interpolate areas of the image or frame. In an exemplary embodiment, the adaptive filter as described may be used for video coding standards, such as for example, H.263, MPEG 4 part 2, H.264, H.265, and for the like.

Various embodiments of the present invention provide devices and methods for fixed-point implementation of adaptive image filtering. Image or frame interpolation is an exemplary application of adaptive image filtering in video coding or video decoding. In the case where motion vector coordinates are defined in terms of fractions of pixels, image values are interpolated at such locations using neighboring pixel values and possibly other already interpolated values. In the video codec H.264 for example a 6-tap interpolation filter, e.g. a filter with six coefficients, is used. In video compression, the coding efficiency, e.g. bit rate or file size of compressed representation versus visual quality of video sequence, of a video coding system may be improved by using adaptive interpolation filters. Adaptive interpolation filters have filter coefficients that may vary at each frame or at each macroblock. In video coding, by using adaptive filters for interpolation a non-stationary property of the video signal may be captured more accurately. When using adaptive filters, video encoder 200 for example may transmit the filter coefficients in the bit stream to the decoder. Encoder 200 can change the filter coefficients at a frame, slice or macroblock level by analyzing the video signal. Decoder 300 uses the received filter coefficients, rather than a predefined filter in the inter prediction process.

In a fixed-point integer implementation of an adaptive filter, in order to determine a structure that provides an n-bit implementation, where n is an integer, even when a filter coefficient may take any value. It is possible that filter coefficients may be defined with low accuracy so that the interpolation is performed in n-bit integer arithmetic without overflowing the n-bit accumulators. However, this approach is not desirable as it results in significant coding efficiency penalty because of the reduced accuracy for filter coefficients. Embodiments of this invention describe fixed-point implementations that can achieve high coding efficiency. Various embodiments of the invention can be implemented at the encoder and at the decoder level. In an exemplary embodiment, a 16-bit implementation is used.

Although an exemplary six-tap filter is described, the invention is not limited to six-tap filters. The choice of a six-tap filter is an example to illustrate various embodiments and should not be understood as a restriction or a requirement for any embodiment of the invention. The generalization to any tap-length and/or to two-dimensional non-separable filters should be apparent to a person skilled in the art based on the embodiments and/or teachings described in this document.

For a filter with floating-point filter coefficients $C_0'$, $C_1', \ldots, C_5'$ the filter output, corresponding to image samples $X_k, X_{k-1}, \ldots, X_{k-5}$, is $$Y' = \sum_{i=0}^{5} C_i' \cdot X_{k-i}, \qquad (1)$$

where $k, k-1, \ldots, k-5$ are indices of the image data samples. In order to perform filtering in integer arithmetic, first the floating-point filter coefficients are mapped to integer values as $$C_i = \text{int}(C_i' << N), \qquad (2)$$

where $\text{int}(\cdot)$ indicates the casting operator converting a floating-point number to integer by removing the floating part, $<<$ indicates left shift operator and N is a positive integer representing the number of left shifts. The integer N determines the accuracy of integer filter coefficients, for example the larger the value of N, the better the accuracy of the integer filter coefficients. However, in an exemplary embodiment N would be small enough to avoid overflow in an integer arithmetic implementation of an adaptive filter. Filtering in integer arithmetic may be defined as $$Y = \left( \sum_{i=0}^{5} C_i X_{k-i} + R \right) \bigg/ M, \qquad (3)$$

where M is equal to $2^N$ and R is a rounding offset and in an exemplary embodiment is equal to M/2. For simplicity, the rounding offset is assumed to be 0 hereinafter. This is because the results in the described embodiments are not affected by the value of R. However, in other embodiments the rounding offset may be taken into account if it affects the results. In the exemplary embodiment instead of using computationally expensive divisor operator, a right shift operator is used. Therefore:

$$Y = \left( \sum_{i=0}^{5} C_i X_{k-i} \right) >> N. \qquad (4)$$

Figure 8:
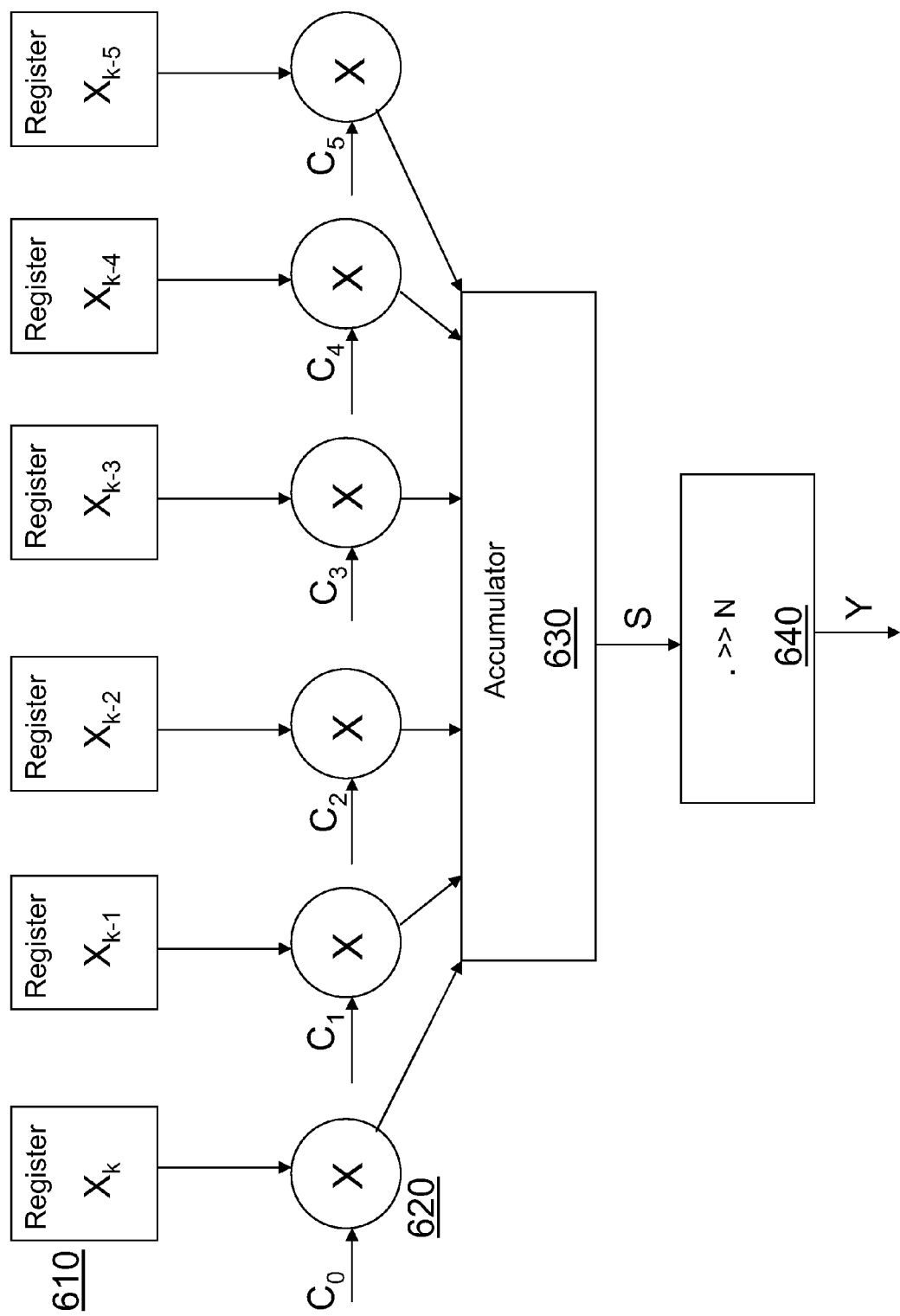
FIG. 8 is a block diagram of an exemplary implementation of an adaptive filter according to an embodiment of the present invention.

FIG. 8 describes an integer implementation of an exemplary six-tap filter. In order for the operation in Equation (4) to be performed in 16-bit arithmetic, the value of the convolution sum $$S = \sum_{i=0}^{5} C_i X_{k-i} \qquad (5)$$

fits in 16-bit registers regardless of the pixel and coefficient values. It is desirable to avoid positive overflow and negative overflow in a 16-bit operation. In an exemplary embodiment, positive overflow may be avoided by fitting 255×(Sum-of-positive-$C_i$) in a signed 16-bit register, for i=0 through 5. In an exemplary embodiment, negative overflow may be avoided by fitting 255×(Sum-of-negative-$C_i$) in a signed 16-bit register, for i=0 through 5. Assuming the pixel samples are defined in 8 bit, then the largest and smallest value a pixel may take is 255 and 0. In order to prevent positive overflow, $255 \times (\text{Sum-of-positive-}C_i) \leq 2^{15}-1$ (i=0 through 5)

$(\text{Sum-of-positive-}C_i) \leq 128$ (i=0 through 5)

$C_i < 16$ (assuming worst case where all coefficients are positive).

In order to prevent negative overflow, $255 \times (\text{Sum-of-negative-}C_i) \geq -(2^{15}-1)$ (i=0 through 5)

$(\text{Sum-of-negative-}C_i) \geq -128$ (i=0 through 5)

$C_i > -16$ (assuming worst case where all coefficients are negative).

As shown above, if $-16 < C_i < 16$ for all filter coefficients, 16-bit operation is guaranteed. If the value of N is 4, the value of the filter coefficients may be $-15/16, -14/16 \ldots 14/16, 15/16$. This means the accuracy of the filter coefficients is 1/16. A filter coefficient accuracy of 1/16 is too low as it reduces the coding efficiency of adaptive interpolation schemes.

Figure 6:
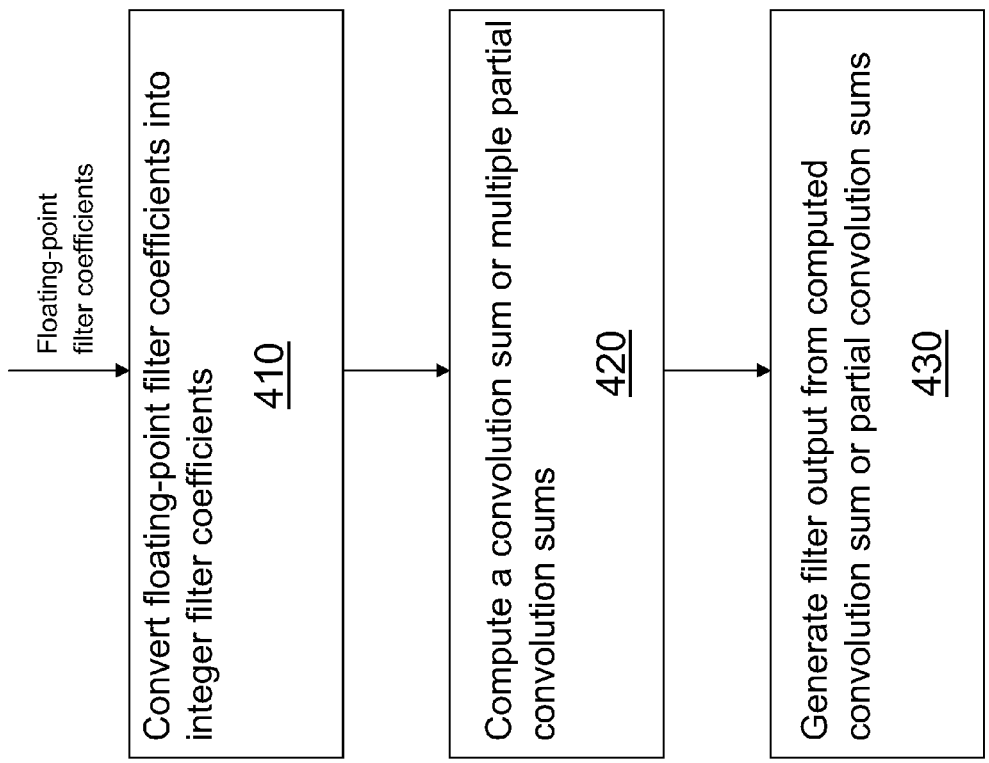
FIG. 6 is a flow chart for filter output generation in accordance with an exemplary embodiment of the present invention.

FIG. 6 is a flow chart for filter output generation in accordance with an exemplary embodiment of the present invention. In the case where the filter coefficients have floating-point values, in block 410, the values of the filter coefficients may be converted into integers. The accuracy of the conversion may be defined by a precision index. Higher accuracy may be achieved with a larger precision index. In block 420, integer value filter coefficients and image data samples may be used to calculate a convolution sum or multiple partial convolution sums. A large precision index may result in a positive or negative overflow when computing a convolution sum or a partial convolution sum in a n-bit arithmetic, where n is an integer. In order to avoid positive or negative overflow the filter coefficients may be restricted, for example by constraints or upper and lower bounds that may prevent positive and/re negative overflow. In block 430, the filter output is generated. In an exemplary embodiment, the filter output is generated from the convolution sum calculated in block 420. In another exemplary embodiment, the filter output is generated from the partial convolution sums calculated in block 420. The operations done within the block 420 may depend on the implementation of the filtering process.

Figure 7:
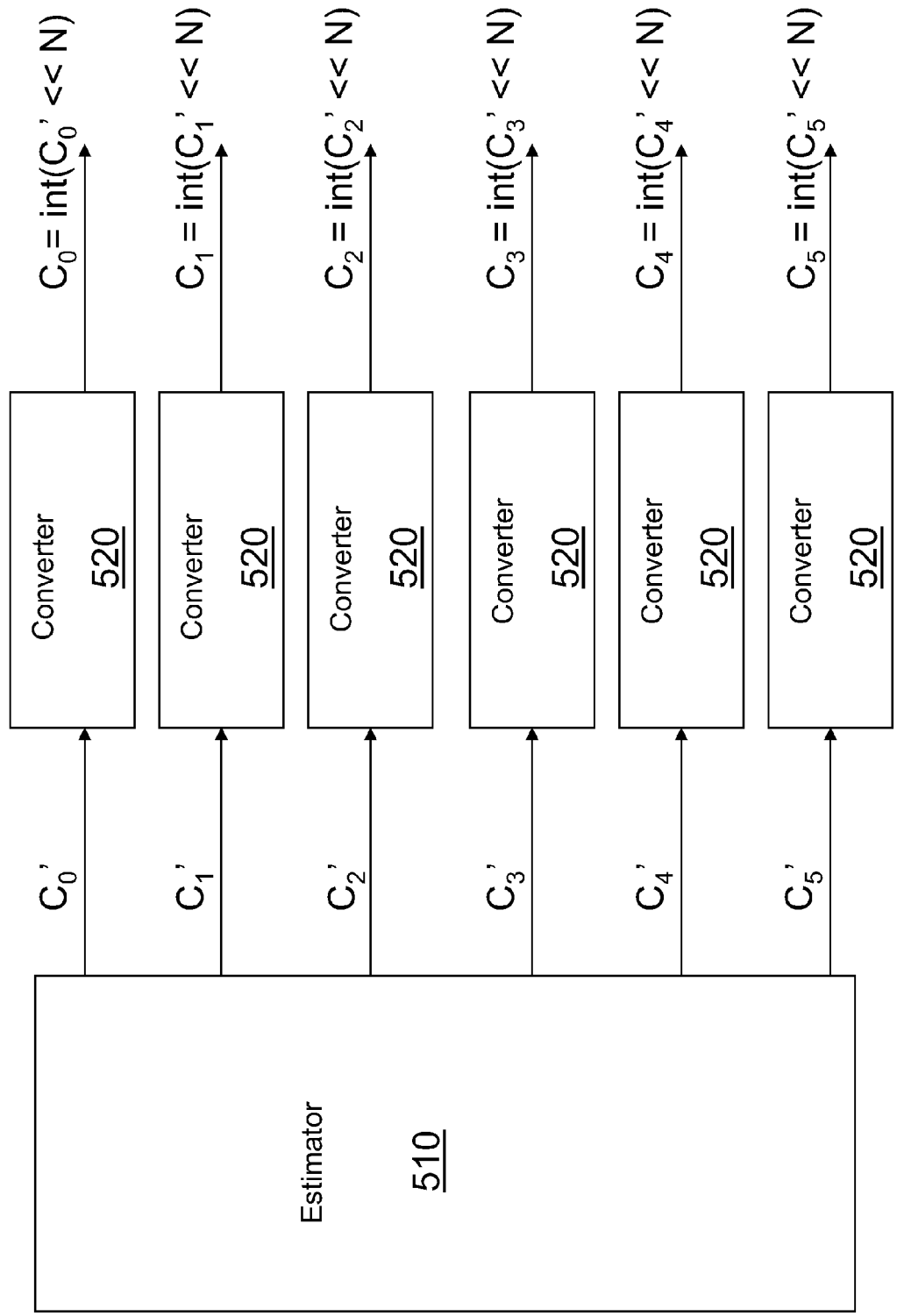
FIG. 7 is a block diagram of an exemplary implementation of a conversion of floating-point filter coefficients to integer filter coefficients.

FIG. 7 is a block diagram of an exemplary implementation of a conversion of floating-point filter coefficients to integer filter coefficients. In the exemplary embodiment, an estimator 510 may generate floating-point filter coefficients $C_0', C_1', \ldots, C_5'$. For a precision index N, the floating-point to integer value converter 520 may scale the floating-point coefficients by $2^N$, left shifting by N. In an exemplary embodiment, the integer value filter coefficients are equal to the integer part of the scaled, or left shifted, floating-point coefficients. Although in FIG. 7 a plurality of converters 520 is shown, in an alternative embodiment the same converter may be used to convert more than one floating-point filter coefficient to integer filter coefficients. In another exemplary embodiment, the conversion from floating-point coefficients to integer coefficients may be implemented within the estimator 510. For example, if filter coefficients are estimated using a recursive algorithm, e.g. least mean square LMS algorithm, the conversion may be applied at each iteration of the algorithm.

Figure 9:
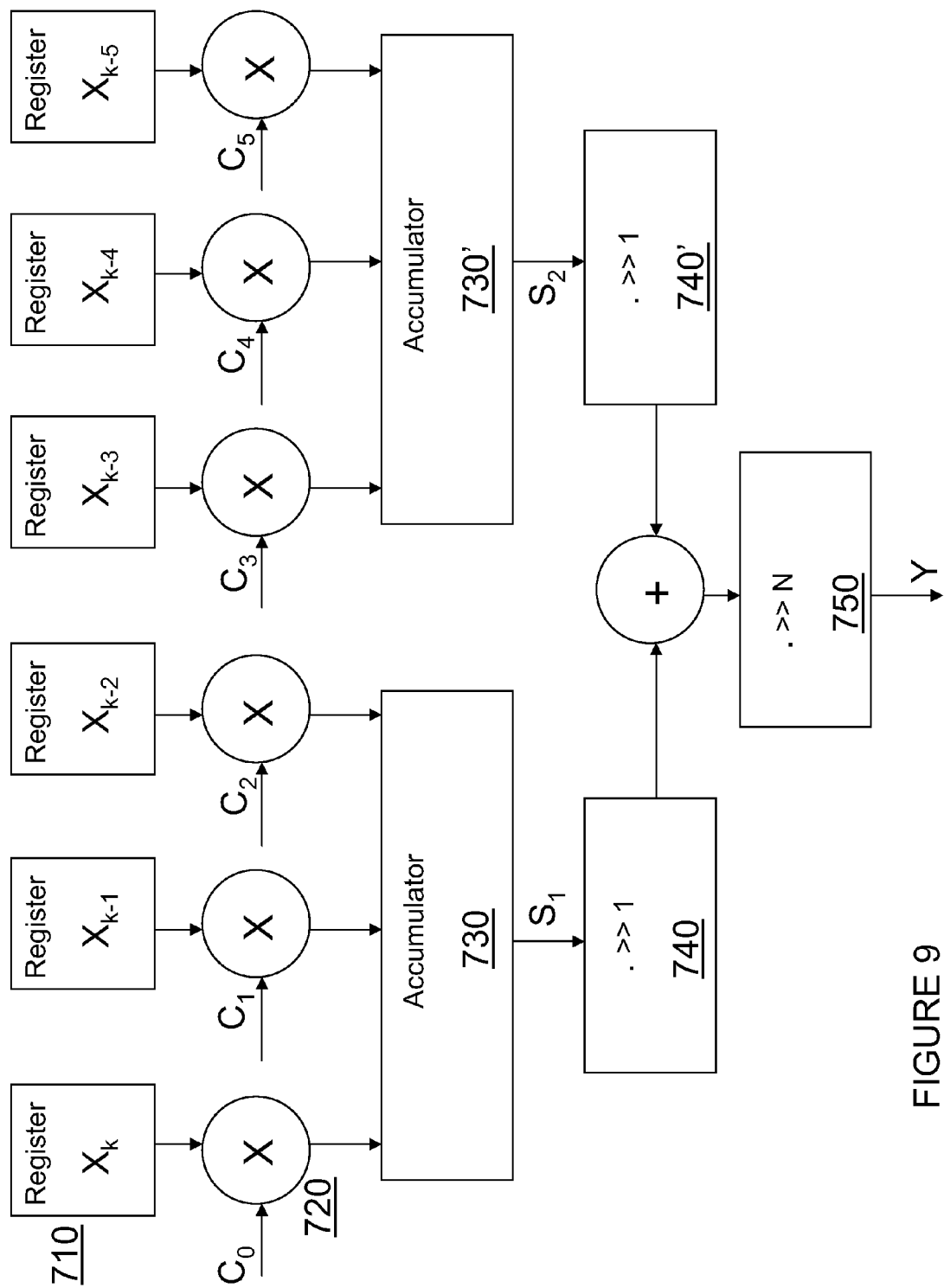
FIG. 9 is a block diagram of an exemplary implementation of an adaptive filter according to another embodiment of the present invention.

FIG. 9 is a block diagram of an exemplary implementation of an adaptive filter according to another embodiment of the present invention. Image data samples $X_k, X_{k-1}, \ldots, X_{k-5}$, stored in registers 710, and corresponding integer coefficients $C_0, C_1, \ldots, C_5$ are multiplied using integer multipliers 720. Two subsets of multiplication products, e.g. outputs of integer multipliers, are fed to two different accumulators 730 and 730'. Accumulators 730 and 730', respectively, generate partial convolution sums S1 and S2. Each of S1 and S2 is a convolution sum associated with a subset of the filter coefficients, for example S1 is associated with $C_0, C_1$ and $C_2$ and the corresponding pixels' values, whereas S2 is associated with $C_3, C_4$ and $C_5$ and the corresponding pixels' values. S1 and S2 are both right shifted, for example by 1, by a shifting operator 740. The shifted results are summed up and a shifting operator 750 right shifts the sum by N generating the filter output Y. The filter output Y is equal to $(S1+S2) \gg N$, where N is a precision index that determines the accuracy of the integer filter coefficients. In the exemplary embodiment, the precision index is defined based on constraints on S1 and S2 to avoid overflow. In a 16-bit implementation in order to avoid overflow and underflow:

$-(2^{15}-1) \leq S1 \leq <2^{15}-1$ and $-(2^{15}-1) \leq S2 \leq 2^{15}-1$.

Since image pixel values are usually positive and have an integer range of [0,255], therefore $255 \times (\text{sum-of-positive-}C_i) \leq 2^{15}-1$, for i=0 through 2 OR i=3 through 5; and $255 \times (\text{sum-of-negative-}C_i) \geq -(2^{15}-1)$, for i=0 through 2 OR i=3 through 5.

That is, sum-of-positive-$C_i \leq 128$ and sum-of-negative-$C_i \geq -128$. Therefore $-32 < C_i < 32$. If N is 5 then the values of the filter coefficients may be $-31/32, -31/32 \ldots 30/32, 31/32$. This means the accuracy of the filter coefficients is 1/32, which is twice as much as the accuracy of the filter coefficients obtained by the interpolation done according to an embodiment described in FIG. 8 and with no restriction on the filter coefficients. In other words by limiting the sum of positive and the sum of negative coefficients, the embodiment described in FIG. 9 provides 16-bit implementation of the filtering process with two times the accuracy for filter coefficients compared to an implementation of an adaptive filter with one convolution sum and no limits being enforced.

FIG. 8 is a block diagram of an exemplary implementation of an adaptive filter according to an embodiment of the present invention. According to the exemplary embodiment, image data samples $X_k, X_{k-1}, \ldots, X_{k-5}$, stored in registers 610, and corresponding integer coefficients $C_0, C_1, \ldots, C_5$ are multiplied using integer multipliers 620. Multiplication products, e.g. outputs of integer multipliers, are fed to an accumulator 630. The accumulator 630 computes the convolution sum corresponding to all filter coefficients but with limitation on the coefficients, e.g.

$255 \times (\text{sum-of-positive-}C_i) \leq 2^{15}-1$, for i=0 through 5; and $255 \times (\text{sum-of-negative-}C_i) \geq -(2^{15}-1)$, for i=0 through 5.

Or similarly $(\text{sum-of-positive-}C_i) \leq 128$, for i=0 through 5; and $(\text{sum-of-negative-}C_i) \geq -128$, for i=0 through 5.

In this case N may be as large as 6. For N=6, filter coefficients can take values $-63/64, -62/64 \ldots 62/64, 63/64$. If we use a higher accuracy, for example N=7, filters for example with at least one filter coefficient being negative may result in an overflow. The achieved accuracy for N=6 is four times higher than accuracy with N=4.

Figure 10:
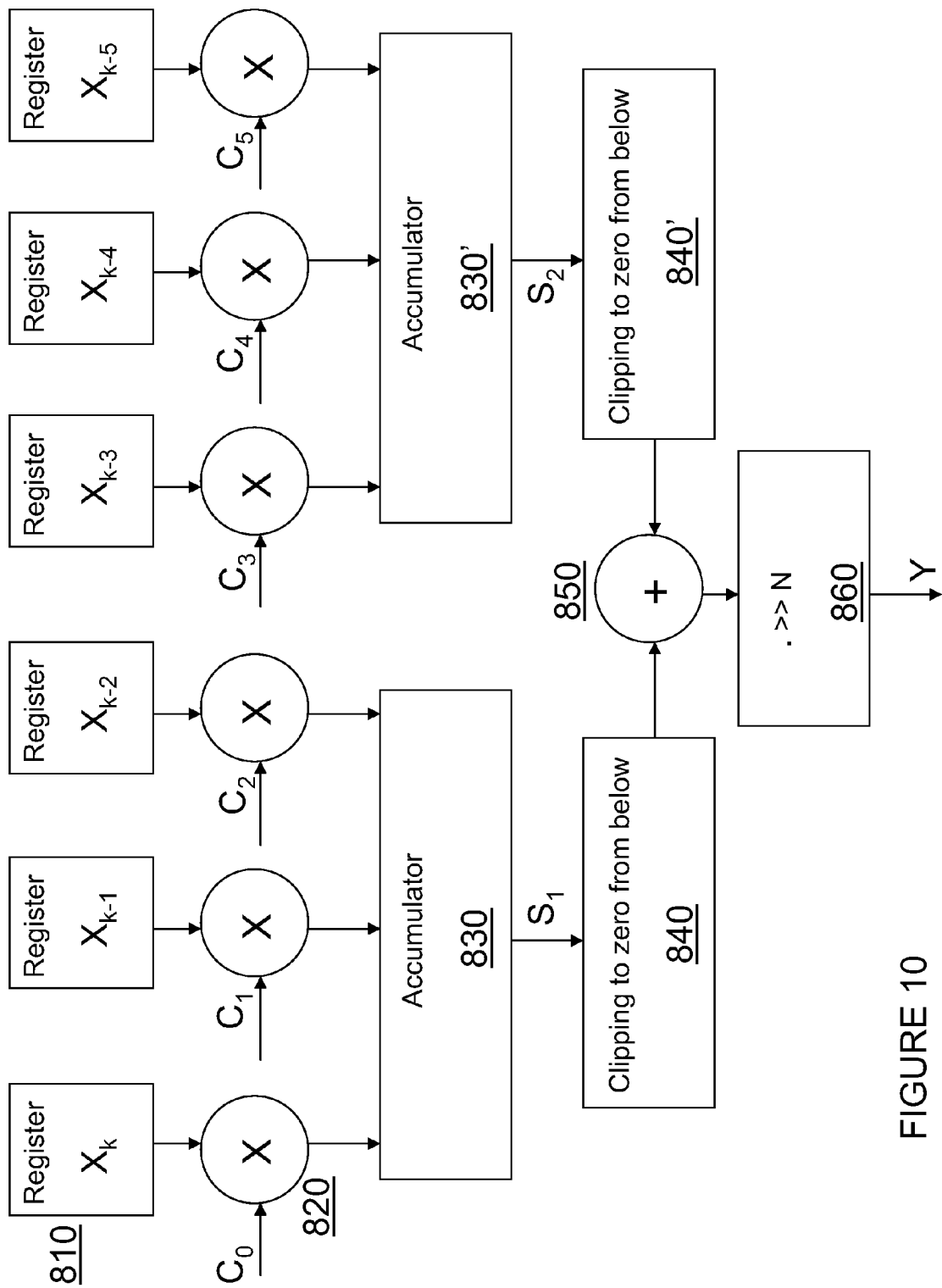
FIG. 10 is a block diagram of an exemplary implementation of an adaptive filter according to yet another embodiment of the present invention.

FIG. 10 is a block diagram of an exemplary implementation of an adaptive filter according to yet another embodiment of the present invention. According to this exemplary embodiment, image data samples $X_k, X_{k-1}, \ldots, X_{k-5}$, stored in registers 810, and corresponding integer coefficients $C_0, C_1, \ldots, C_5$ are multiplied using integer multipliers 820. Two subsets of multiplication products, e.g. outputs of integer multipliers, are fed to two different accumulators 830 and 830'. Accumulators 830 and 830', respectively, generate partial convolution sums S1 and S2. S1 corresponds to the multiplication products generated by the multipliers 820 with input equal to the filter coefficients $C_0, C_1$ and $C_2$ and the corresponding data samples, e.g. $X_k, X_{k-1}$ and $X_{k-2}$. The partial sum S2 corresponds to the multiplication products generated by the multipliers 820 with input equal to the filter coefficients $C_3, C_4$ and $C_5$ and the corresponding data samples, e.g. $X_{k-3}, X_{k-4}$ and $X_{k-5}$. In order to avoid overflow, sum-of-positive $C_0$-$C_1$-$C_2 \leq 128$ and sum-of-negative-$C_0$-$C_1$-$C_2 \geq -128$, and sum-of-positive $C_3$-$C_4$-$C_5 \leq 128$ and sum-of-negative $C_3$-$C_4$-$C_5 \geq -128$.

The partial convolution sum S1 is computed using signed arithmetic since any of the filter coefficients $C_0, C_1$ and $C_2$ may be positive or may be negative. For typical image filters, e.g. interpolation filters, the filter output is usually positive since the filter output represents an image pixel value. In an exemplary embodiment where the partial convolution sums S1 and S2 are usually positive, for example when the filter is symmetric with $C_0=C_5, C_1=C_4$ and $C_2=C_3$, the partial convolution sum S1 and/or the partial convolution sum S2 may be clipped with a clipping operator 840 or 840'. That is if S1 is negative, S1 is clipped to 0 and/or if S2 is negative, S2 is clipped to zero. Upon clipping negative partial convolution sums to 0, the sign bit for S1 and S2 is usually 0. After clipping partial convolution sums, an unsigned addition operator 850 is used to calculate S1+S2 may be used. The clipping and the use of unsigned addition, instead of signed addition, to compute S1+S2 make it possible to gain one bit accuracy. With this interpolation process, N may be equal to 7 and coefficients now can take values of $-127/128, -126/128 \ldots 126/128, 127/128$, with accuracy being 1/128.

Figure 11:
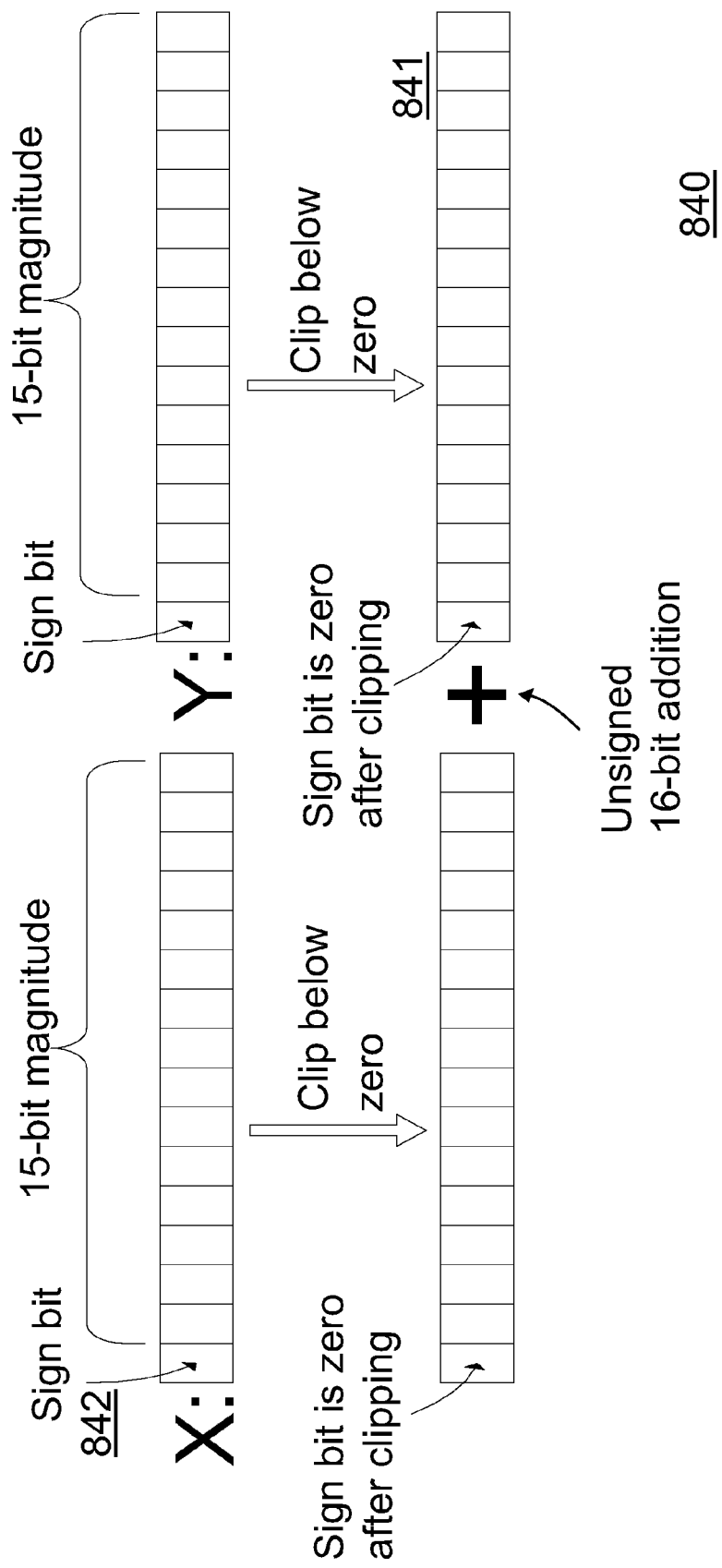
FIG. 11 is a schematic diagram of an exemplary clipping operation in accordance with an embodiment of the present invention.

FIG. 11 is a block diagram of an exemplary implementation of a clipping of a signed integer to an unsigned integer. If a signed integer, stored in a 16-bit register 841, is negative, the sign bit 842 is equal to 1. If the signed integer is positive, the sign bit 842 is 0. The clipping operation changes the value of the sign bit to 0 and all the other bits to 0. In other words, clipping changes a negative integer to 0. Therefore after clipping, the sign bits of clipped integers are zeros.

Figure 12:
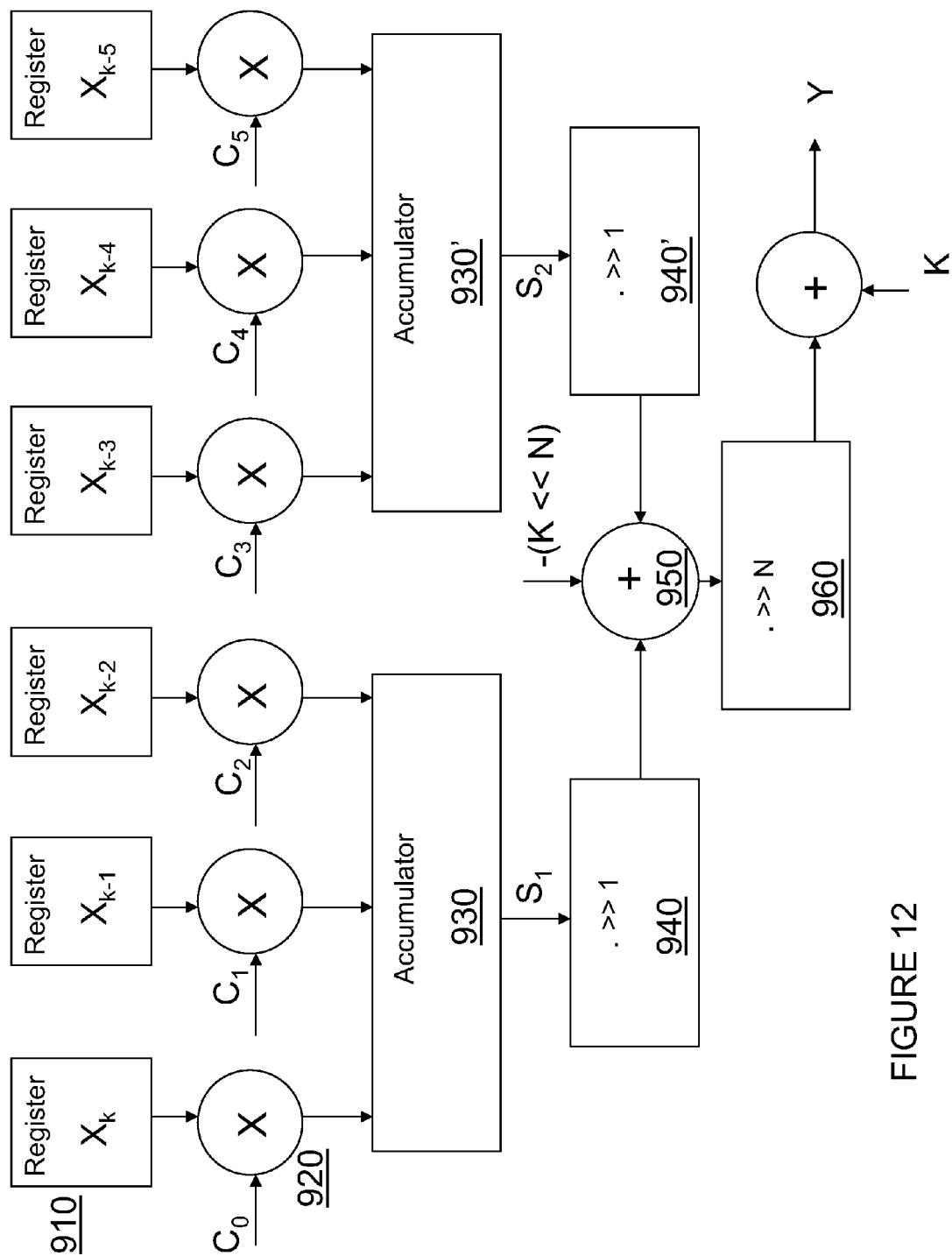
FIG. 12 is a block diagram of an exemplary implementation of an adaptive filter according to another embodiment of the present invention.

FIG. 12 is a block diagram of an exemplary implementation of an adaptive filter according to another embodiment of the present invention. In the exemplary implementation integer multipliers 920 multiply image data samples $X_k, X_{k-1}, \ldots, X_{k-5}$, in registers 910 with corresponding filter coefficients $C_0, C_1, \ldots, C_5$ to generate six multiplication products, e.g. a multiplication product $C_i X_{k-i}$ for each filter coefficient $C_i$. An accumulator 930 computes a partial convolution sum S1 using multiplication products corresponding to the filter coefficients $C_0, C_1, C_2$, e.g. $S1=C_0 X_k+C_1 X_{k-1}+C_2 X_{k-2}$. Another accumulator 930' computes another convolution sum S2 corresponding to coefficients $C_3, C_4, C_5$, e.g. $S2=C_3 X_{k-3}+C_4 X_{k-4}+C_5 X_{k-5}$. Right shift operators 940 and 940' are, respectively, applied to the partial convolution sums S1 and S2. An accumulator 950 computes the sum $(S1>>1)+(S2>>1)-(K<<N)$ where K is an integer and N is the precision index of the filter coefficients. A shift operator 960 shifts the sum $(S1>>1)+(S2>>1)-(K<<N)$ by N. The result $[(S1>>1)+(S2>>1)-(K<<N)]>>N$ is incremented by K to generate the filter output. For many filters, e.g. interpolation filters, magnitudes of positive filter coefficients are usually larger than magnitudes of negative filter coefficients. In the exemplary embodiment, the value range of partial convolution sums is shifted. Shifting the value range of partial convolution sums may prevent wasting binary words, e.g. binary representations of partial convolution sums, for negative partial convolution sums that might not occur, for example for typical interpolation filters. In other words the number of binary words allocated for positive partial convolution sums' values is larger than the number of binary words allocated for negative convolution sums' values. The filter output is $Y=[(C^0 \cdot X_k+C_1 \cdot X_{k-1}+C_2 \cdot X_{k-2})>>1+(D \cdot X3+E \cdot X4+F \cdot X5)>>1-(K<<N)]>>N+K$. In the exemplary implementation, for example for $K=128=2^7$ and $N=7$, in order to avoid positive and negative overflow, $255 \times$(sum-of-positive-$C_i) \leq (2^{15}-1)+2^{14}$ for $i=0$ through 2 OR $i=3$ through 5

$255 \times$(sum-of-negative-$C_i) \geq -(2^{15}-1)+2^{14}$ for $i=0$ through 2 OR $i=3$ through 5.

That is, (sum-of-positive-$C_i) \leq 2^7+2^6=192$ for $i=0$ through 2 OR $i=3$ through 5

(sum-of-negative-$C_i) \geq -2^7+2^6=-64$ for $i=0$ through 2 OR $i=3$ through 5.

With this interpolation process, N could be given as 7 and coefficients now can take values of $-63/128, -62/128 \ldots 190/128, 191/128$, with accuracy being 1/128. The advantage of this solution is that the number of values used to represent positive filter coefficients is larger than the number of values used to represent negative filter coefficients, e.g. values representing negative filter coefficients are $-63/128, \ldots, -1/128$ whereas values representing positive filter coefficients are $1/128, \ldots, 192/128$. In another exemplary embodiment, the shift in the range of values may also be applied to the convolution sum S of FIG. 8. Applying the shift in the range of intermediate values, e.g. convolution sum, partial convolution sums or scaled partial convolution sums, should be apparent to a skilled person in the art.

According to an exemplary embodiment where the adaptive filter is used as or comprises an image interpolation filter, the precision index N may be different for different interpolation points, for example points whose coordinates are defined as fractions of a pixel and also commonly referred to as sub-pixels. For example, for one interpolation sub-pixel point the precision index may be 4 while for another interpolation sub-pixel point the precision index may be 6. In yet another embodiment, the precision index may be defined based on the floating point values of the filter coefficients. For example, if filter coefficients are relatively small then a large N may be preferred for integer representation. For example if filter coefficients are in a range $[-1, 1]$ then the precision index may be 7, whereas if filter coefficients are in a range $[-0.5, 0.5]$ then the precision index may be 8. Other implementations may also use different ways to decide on the value of N for different interpolation points.

Exemplary embodiments of the present invention teach 16-bit arithmetic implementations of an adaptive interpolation filter with high coding efficiency. By applying restrictions, e.g. upper bound and lower bound constraints, on filter coefficients a higher accuracy of the filter coefficients is achieved. Exemplary embodiments of the present invention should not be interpreted in a restrictive sense. For example teachings of embodiments of the present invention may be applied in image or frame interpolation and also in other video coding, video processing and image processing applications, including but not restricted to deblocking filters, image and video enhancement and video and image editing. Extending the exemplary 16-bit implementation, of an adaptive filter, described in the present invention to a more general n-bit arithmetic implementation of an adaptive filter, based on the exemplary embodiments and the teachings of the present invention, should be apparent to a skilled person in the art.

Embodiments of the present invention may be implemented in software, hardware, application logic or a combination of software, hardware and application logic. The software, application logic and/or hardware may reside on a chipset, a mobile device, a desktop, a laptop or a server. The application logic, software or an instruction set is preferably maintained on any one of various conventional computer-readable media. In the context of this document, a "computer-readable medium" can be any media or means that can contain, store, communicate, propagate or transport the instructions for use by or in connection with an instruction execution system, apparatus, or device.

If desired, the different functions discussed herein may be performed in any order and/or concurrently with each other. Furthermore, if desired, one or more of the above-described functions may be optional or may be combined.

Without in any way limiting the scope, interpretation, or application of the claims appearing below, it is possible that a technical advantage of one or more of the exemplary embodiments disclosed herein may be high coding efficiency. Another possible technical advantage of one or more of the exemplary embodiments disclosed herein may be an adaptive filter implementation with low computational complexity. Another technical advantage of one or more of the exemplary embodiments disclosed herein may be simple and efficient adaptive filtering for video coding and image processing.

It is also noted herein that while the above describes exemplifying embodiments of the invention, these descriptions should not be viewed in a limiting sense. Rather, there are several variations and modifications which may be made without departing from the scope of the present invention as defined in the appended claims.

What is claimed is:

1. An apparatus, comprising,
at least a processor, a memory operationally associated with said processor and having computer coded instructions therein, said instructions when executed by the processor causing the apparatus to:
operate as an image filter, wherein at least one integer coefficient of said image filter is restricted, at least one of a convolution sum and multiple partial convolution sums of said image filter being determined based at least in part on said at least one integer coefficient, said at least one of a convolution sum and multiple partial convolution sums having a binary representation with a fixed maximum number of bits, and said at least one integer coefficient having a binary representation with a number of bits defined by a precision index;
generate an output of said adaptive image filter based at least in part on said at least one of a convolution sum and multiple partial convolution sums;
right shift said multiple partial convolution sums;
compute a sum of said right shifted multiple partial convolution sums and a negative number; and
right shift said computed sum of said right shifted multiple partial convolution sums and said negative number.

2. The apparatus of claim 1, wherein said image filter comprises an adaptive filter of a video encoder and at least one of said precision index and said at least one integer coefficient is coded into a bit stream.

3. The apparatus of claim 1, wherein said image filter comprises an adaptive filter of a video decoder and at least one of said precision index and said at least one integer coefficient is decoded from a bit stream.

4. The apparatus of claim 1, wherein said apparatus is a chipset.

5. The apparatus of claim 1, further comprising a memory unit communicatively connected to the processor and configured to store said at least one integer coefficient.

6. The apparatus of claim 1, wherein said image filter comprises an adaptive interpolation filter of a video encoder and said precision index is different for different interpolation points.

7. The apparatus of claim 1, wherein said image filter comprises an adaptive interpolation filter of a video decoder and said precision index is different for different interpolation points.

8. The apparatus of claim 1, wherein the at least one coefficient is restricted to within upper and lower bound constraints.

9. The apparatus of claim 8, wherein the upper and lower bound constraints on the at least one coefficient are different for different coefficients.

10. The apparatus of claim 1, wherein said image filter comprises an adaptive loop filter of a video encoder and said precision index is different for different filter coefficients.

11. The apparatus of claim 1, wherein said image filter comprises an adaptive loop filter of a video decoder and said precision index is different for different filter coefficients.

12. A method, comprising:
determining at least one of a convolution sum and multiple partial convolution sums based at least in part on at least one restricted integer coefficient of an adaptive image filter, said at least one of a convolution sum and multiple partial convolution sums being restricted to have a binary representation with a fixed maximum number of bits;
generating an output of said adaptive image filter based at least in part on said at least one of a convolution sum and multiple partial convolution sums;
said generating comprising right shifting said multiple partial convolution sums;
computing a sum of said right shifted multiple partial convolution sums and a negative number; and
right shifting said computed sum of said right shifted multiple partial convolution sums and said negative number.

13. The method of claim 12, wherein said adaptive image filter comprises an interpolation filter.

14. The method of claim 13, wherein said at least one restricted integer coefficient has different arithmetic accuracy for different interpolation points.

15. The method of claim 12, further comprising converting at least one of a floating point coefficient of said adaptive image filter into at least one corresponding integer coefficient of said adaptive image filter, said at least one corresponding integer coefficient having a binary representation with a second fixed maximum number of bits, said converting further comprising restricting said at least one corresponding integer coefficient.

16. The method of claim 12, wherein said at least one restricted integer coefficient is restricted such that a sum of one or more positive restricted integer coefficients in at least one subset of said at least one restricted integer coefficient has an upper bound and a sum of one or more negative integer coefficients in at least one subset of said at least one restricted integer coefficient has a lower bound.

17. The method of claim 12, wherein at least one subset of said at least one restricted integer coefficient has a different value range from at least another subset of said at least one restricted integer coefficient.

18. The method of claim 12, wherein a sum of said at least one restricted integer coefficient having a positive value has a different value range from a sum of said at least one restricted integer coefficient having a negative value.

19. A computer program product comprising computer program code embodied on a non-transitory computer-readable medium, said program code when executed by a processor being configured to cause an apparatus to:
   determine at least one of a convolution sum and multiple partial convolution sums based at least in part on at least one restricted integer coefficient of an image filter, said at least one of a convolution sum and multiple partial convolutions sums being restricted to have a binary representation with a fixed maximum number of bits;
   generate an output of said image filter based at least in part on said at least one of a convolution sum and multiple partial convolution sums;
   said generating comprising right shifting said multiple partial convolution sums;
   computing a sum of said right shifted multiple partial convolution sums and a negative number; and
   right shifting said computed sum of said right shifted multiple partial convolution sums and said negative number.

20. An apparatus, comprising, at least a processor, a memory operationally associated with said processor and having computer coded instructions therein, said instructions when executed by the processor causing the apparatus to:
   determine at least one of a convolution sum and multiple partial convolution sums based at least in part on at least one restricted integer coefficient of an image filter, said at least one of a convolution sum and multiple partial convolution sums being restricted to have a binary representation with a fixed maximum number of bits;
   generate an output of said image filter based at least in part on said at least one of a convolution sum and multiple partial convolution sums;
   said generating comprising right shifting said multiple partial convolution sums;
   computing a sum of said right shifted multiple partial convolution sums and a negative number; and
   right shifting said computed sum of said right shifted multiple partial convolution sums and said negative number.

* * * * *